(12) United States Patent
Fan et al.

(10) Patent No.: US 10,291,608 B2
(45) Date of Patent: May 14, 2019

(54) METHOD AND DEVICE FOR ESTABLISHING WIRELESS CONNECTION

(71) Applicant: Xiaomi Inc., Beijing (CN)

(72) Inventors: Jialin Fan, Beijing (CN); Heng Qu, Beijing (CN); Qiuzhi Huang, Beijing (CN)

(73) Assignee: XIAOMI INC., Beijing (CN)

( * ) Notice: Subject to any disclaimer, the term of this patent is extended or adjusted under 35 U.S.C. 154(b) by 143 days.

(21) Appl. No.: 15/225,301

(22) Filed: Aug. 1, 2016

(65) Prior Publication Data

US 2017/0127467 A1 May 4, 2017

(30) Foreign Application Priority Data

Oct. 29, 2015 (CN) .......................... 2015 1 0717725

(51) Int. Cl.
| | |
|---|---|
| *H04L 29/06* | (2006.01) |
| *G06F 17/30* | (2006.01) |
| *G06F 15/16* | (2006.01) |
| *G06F 7/04* | (2006.01) |
| *H04W 4/12* | (2009.01) |
| *H04W 12/06* | (2009.01) |
| *H04W 48/16* | (2009.01) |
| *H04W 76/15* | (2018.01) |

(Continued)

(52) U.S. Cl.
CPC .......... *H04L 63/083* (2013.01); *H04L 12/283* (2013.01); *H04W 4/12* (2013.01); *H04W 12/06* (2013.01); *H04W 48/16* (2013.01); *H04W 76/15* (2018.02); *H04L 2012/284* (2013.01); *H04W 84/12* (2013.01)

(58) Field of Classification Search
CPC ..... H04W 76/025; H04W 4/12; H04W 12/06; H04W 48/16; H04W 84/12; H04L 12/28; H04L 63/083
USPC .......................................................... 726/7
See application file for complete search history.

(56) References Cited

U.S. PATENT DOCUMENTS

| | | | | |
|---|---|---|---|---|
| 7,283,505 | B1 * | 10/2007 | Meenan .............. | H04L 12/2814 370/338 |
| 7,313,384 | B1 | 12/2007 | Meenan et al. | |
| 7,421,266 | B1 | 9/2008 | Bruestle et al. | |

(Continued)

FOREIGN PATENT DOCUMENTS

| | | |
|---|---|---|
| CN | 102664903 A | 9/2012 |
| CN | 103888337 A | 6/2014 |

(Continued)

OTHER PUBLICATIONS

Vangelis Gazis; Toward a Generic "Always Best Connected" Capability in Integrated WLAN/UMTS Cellular Mobile Networks (and Beyond); IEEE-2005; p. 20-29.*

(Continued)

*Primary Examiner* — Monjur Rahim
(74) *Attorney, Agent, or Firm* — Brinks Gilson & Lione

(57) ABSTRACT

Methods and devices are disclosed for establishing a wireless connection. In one embodiment, a method includes establishing a first wired connection with a router, receiving connection information sent from the router via the first wired connection, wherein the connection information is configured to enable an electronic device to connect wirelessly to the router, and establishing a second wireless connection with the router based on the connection information.

13 Claims, 19 Drawing Sheets

(51) Int. Cl.
*H04L 12/28* (2006.01)
*H04W 84/12* (2009.01)

(56) References Cited

U.S. PATENT DOCUMENTS

| | | | |
|---|---|---|---|
| 2002/0068760 A1 | 6/2002 | Fukuchi | |
| 2004/0229606 A1* | 11/2004 | Oshima | H04L 63/0428 455/426.2 |
| 2006/0068760 A1* | 3/2006 | Hameed | H04L 63/061 455/412.1 |
| 2011/0292835 A1* | 12/2011 | Zhu | H04W 28/18 370/255 |

FOREIGN PATENT DOCUMENTS

| | | |
|---|---|---|
| CN | 103957593 A | 7/2014 |
| CN | 103997692 A | 8/2014 |
| CN | 105246074 A | 1/2016 |
| EP | 2 051 470 A1 | 4/2009 |
| JP | 2003-179609 A | 6/2003 |
| JP | 2009-105895 A | 5/2009 |
| JP | 2012-134703 A | 7/2012 |
| JP | 2015-070518 A | 4/2015 |
| KR | 10-2015-0045920 A | 4/2015 |
| RU | 2 357 282 C2 | 5/2009 |
| RU | 2 467 380 C2 | 11/2012 |
| WO | WO 03/081373 A2 | 10/2003 |
| WO | WO 2004/098150 A1 | 11/2004 |

OTHER PUBLICATIONS

English Translation of International Search Report dated May 4, 2016 for International Application No. PCT/CN2015/099401, 4 pages.
Examination Report dated Sep. 1, 2017 for European Application No. 16163431.6, 6 pages.
Office Action dated May 17, 2017 for Korean Application No. 10-2016-7005717, 5 pages.
Office Action dated Jul. 27, 2017 for Russian Application No. 2016113880/07, 11 pages.
Office Action dated Jan. 9, 2018 for Japanese Application No. 2017-547055, 3 pages.
International Search Report dated May 4, 2016 for PCT Application No. PCT/CN2015/099401 (4 pp.).
Extended European Search Report dated Jun. 13, 2016 for EP Application No. 16163431.6 (7 pp.).
Office Action dated Apr. 17, 2018 for Japanese Application No. 2017-547055, 3 pages.

* cited by examiner

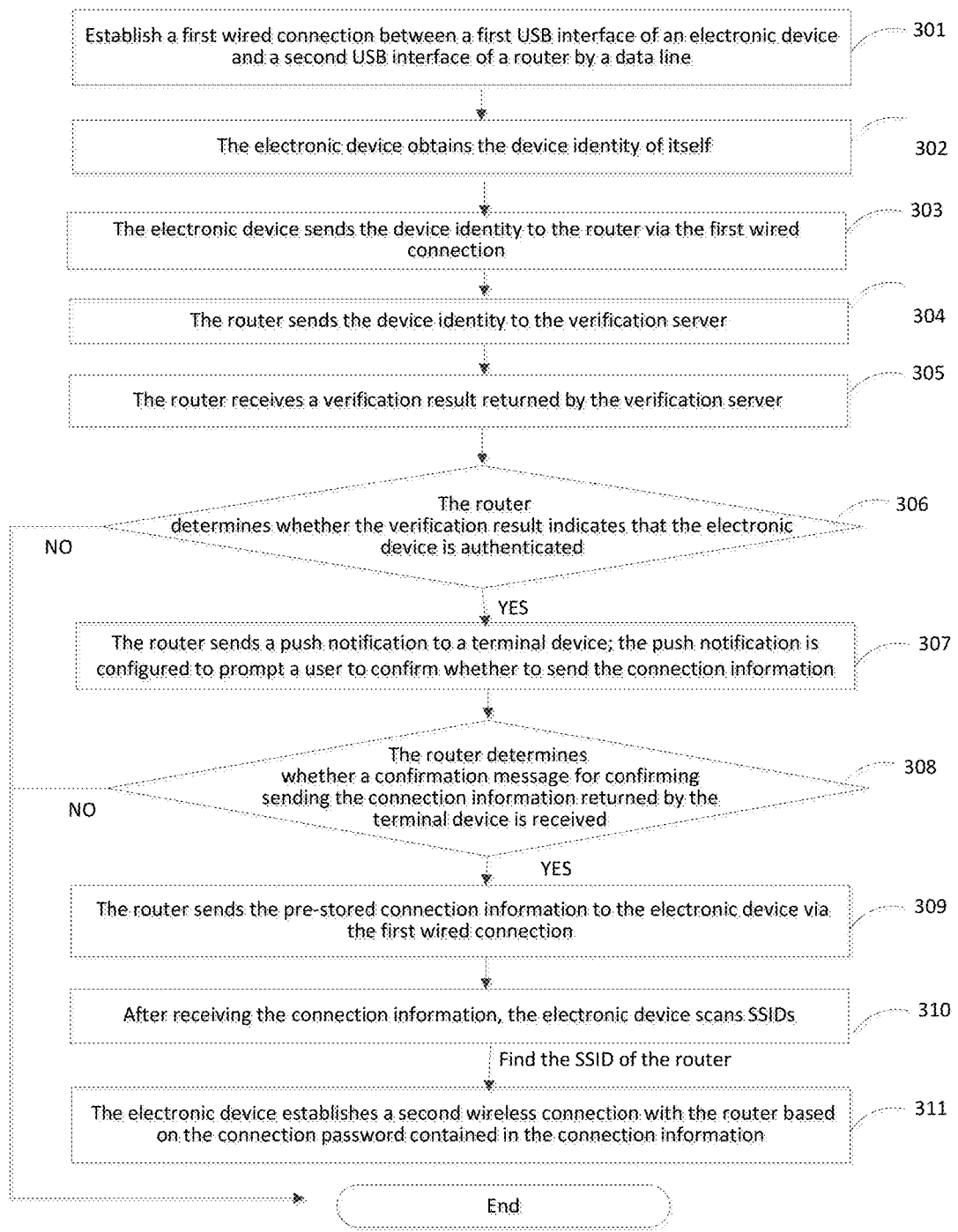

METHOD AND DEVICE FOR ESTABLISHING WIRELESS CONNECTION

CROSS-REFERENCE TO RELATED APPLICATION

This application is based upon and claims priority to Chinese Patent Application No. 201510717725.7, filed Oct. 29, 2015, the entire contents of which are incorporated herein by reference.

TECHNICAL FIELD

The present disclosure generally relates to the field of communication, and more particularly, to a method and a device for establishing a connection.

BACKGROUND

Increasingly more smart devices may be connected to a router via Wireless Fidelity (Wi-Fi) so that users can access the Internet via the smart devices. In related arts, the smart devices obtain connection information of the router by Wi-Fi protected Setup (WPS) procedure. The connection information may include a Service Set Identifier (SSID) of the router and a connection password which enables the user to connect to the router.

However, in the WPS procedure, the smart devices obtain the connection information in a wireless manner which is not safe. If the WPS mode is started and other smart devices are in a monitoring state, the connection information of the router may be leaked and information security may be compromised.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for establishing a wireless connection is disclosed, comprising: establishing a first wired connection with a router; receiving a connection information sent from the router via the first wired connection, wherein the connection information is configured to enable the electronic device to connect wirelessly to the router; and establishing a second wireless connection with the router based on the connection information.

In another embodiment, another method for establishing a wireless connection is disclosed, comprising: establishing a first wired connection with an electronic device; sending a pre-stored connection information to the electronic device via the first wired connection, wherein the connection information is configured to enable the electronic device connect wirelessly to the router; and causing the electronic device to establish a second wireless connection with the router based on the connection information.

In one embodiment, an electronic device is disclosed, comprising a processor; a memory for storing instructions executable by the processor; a wireless connection interface; and a wired connection interface, wherein the processor is configured to: establish a first wired connection with a router via the wired connection interface of the electronic device; receive a connection information sent from the router via the first wired connection, wherein the connection information is configured to enable the electronic device to connect to the router via the wireless connection interface; and establish a second wireless connection with the router via the wireless connection interface based on the connection information.

In another embodiment, an electronic device is disclosed, comprising a processor; a memory for storing instructions executable by the processor; a wireless connection interface; and a wired connection interface, wherein the processor is configured to: establish a first wired connection with an electronic device via the wired connection interface; send a pre-stored connection information to the electronic device via the first wired connection, wherein the connection information is configured to enable the electronic device to connect wirelessly to the router; and cause the electronic device to establish a second wireless connection with the router via the wireless connection interface based on the connection information.

In another embodiment, a system is provided comprising an electronic device comprising: a first processor; and a first memory for storing instructions executable by the first processor; a first wireless connection interface; and a first wired connection interface; and a router comprising: a second processor; and a second memory for storing instructions executable by the second processor; a second wireless connection interface; and a second wired connection interface, wherein the first processor is configured to: establish a wired connection with the router via the first and second wired connection interface; receive a connection information pre-stored in the router via the wired connection, wherein the connection information is configured to enable the electronic device to connect to the router via the first and second wireless connection interface; and establish a wireless connection with the router via the first and second wireless connection interfaces; and wherein the second processor is configured to: establish the wired connection with the electronic device via the second and first wired connection interface; send the pre-stored connection information to the electronic device via the wired connection, wherein the connection information is configured to enable the smart device to connect to the router via the first and second wireless connection interfaces; and cause the electronic device to establish the wireless connection with the router via the first and second wireless connection interfaces based on the connection information.

In yet another embodiment, non-transitory computer-readable storage medium having stored therein instructions is provided. The instructions, when executed by a processor of an electronic device, causes the electronic device to: establish a first wired connection with a router; receive connection information sent from the router via the first wired connection, wherein the connection information is configured to enable the electronic device to connect wirelessly to the router; and establish a second wireless connection with the router based on the connection information In another embodiment, a non-transitory computer-readable storage medium having stored therein instructions is provided. The instructions, when executed by a processor of a router, causes the router to: establish a first wired connection with an electronic device; send a pre-stored connection information to the electronic device via the first wired connection, wherein the connection information is configured to enable the smart device to connect wirelessly to the router; and cause the electronic device to establish a second wireless connection with the router based on the connection information.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

FIGS. 7A and 7B are flowcharts showing further methods for establishing a wireless connection according to an exemplary embodiment of the present disclosure.

DETAILED DESCRIPTION

Figure 1:
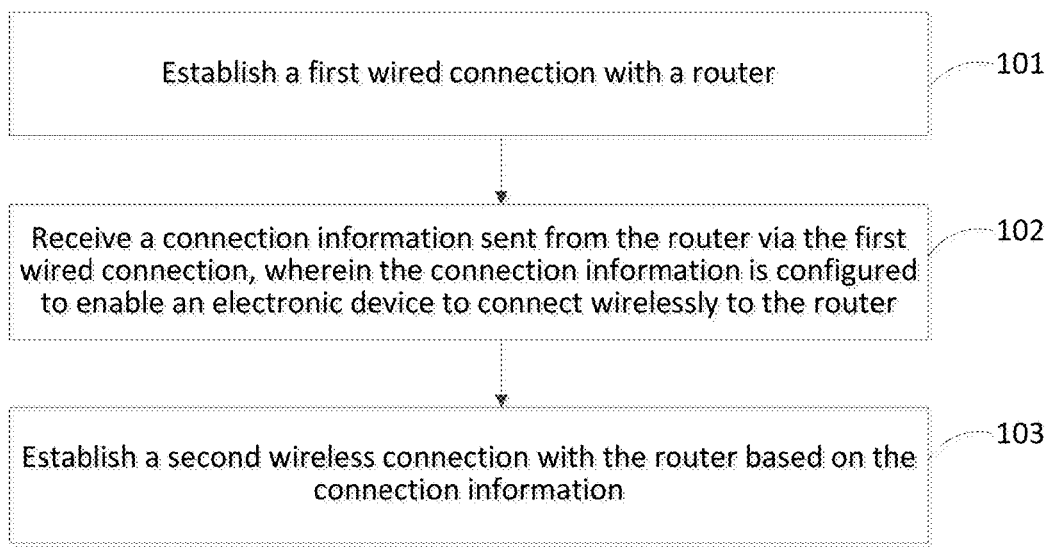
FIG. 1 is a flowchart showing a method for establishing a wireless connection according to an exemplary embodiment of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

The terminology used in the description of the disclosure herein is for the purpose of describing particular examples only and is not intended to be limiting of the disclosure. As used in the description of the disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items.

It shall be appreciated that although the present disclosure uses terminologies "first", "second", and "third" and the like to describe various information, the information shall not be limited by these terminologies. Using these terminologies is only for distinguishing information of the same type. For example, without departing from the scope of the present disclosure, the first information may be referred to as the second information, and similarly, the second information may be referred to as the first information. Depending on the context, the terminology "if" used herein may be interpreted as "when" or "in response to determining."

By way of introduction, electronic devices including smart devices such as mobile phones and laptops may connect to a network router via wireless connections, such as Wi-Fi. Initially, an unencrypted password, as part of wireless connection information, may be given wirelessly to the electronic device by the router. When the device seeks to establish a wireless connection with the router, the electronic device may wirelessly send a connection request to the router with the password encrypted. However, such approach is susceptible to security breach because other wireless devices within the range of the wireless network provided by the router may access the connection information when it was initially sent from the router to the electronic device unencrypted, leading to security leakage. The embodiments below provide methods and devices that are based on passing the wireless connection information through direct wired communications to the electronic device. The electronic device then may use the connection information obtained via wired communications to establish wireless connection with the router. Because a device with physical access to the router (and thus can connect to the router by wires such as USB cables) may have generally already passed some other level of security clearance, these approaches may provide enhanced wireless communication security.

FIG. 1 shows an implementation of a method for establishing a connection according to an exemplary embodiment. The method may be applied in a smart device having a Universal Serial Bus (USB) interface, such as a smart phone, a tablet computer, a Personal Digital Assistant (PDA) and the like. In step 101, a first connection is established with a router in a wired connection manner. For example, the first connection may be established between a first Universal Serial Bus (USB) interface of the smart device and a second USB interface of the router via a data line, such as a USB cable and corresponding USB connectors. Specifically, the router may comprise a USB interface. A user may connect the smart device and the router with a USB data line. The smart device may detect using related technologies that a first connection is established between the first USB interface of the smart device itself and the second USB interface of the router. USB connection is only an example and other types of wired connection may be used.

In step 102, connection information sent from the router is received by the smart device via the first wired connection. The connection information comprises information that enables the smart device to connect to the router in a wireless connection manner. For example, the router may be configured to automatically send the connection information to the smart device via the first connection once the router detects that the first connection is established between the second USB interface of the router itself and the first USB interface of the smart device.

Figure 2:
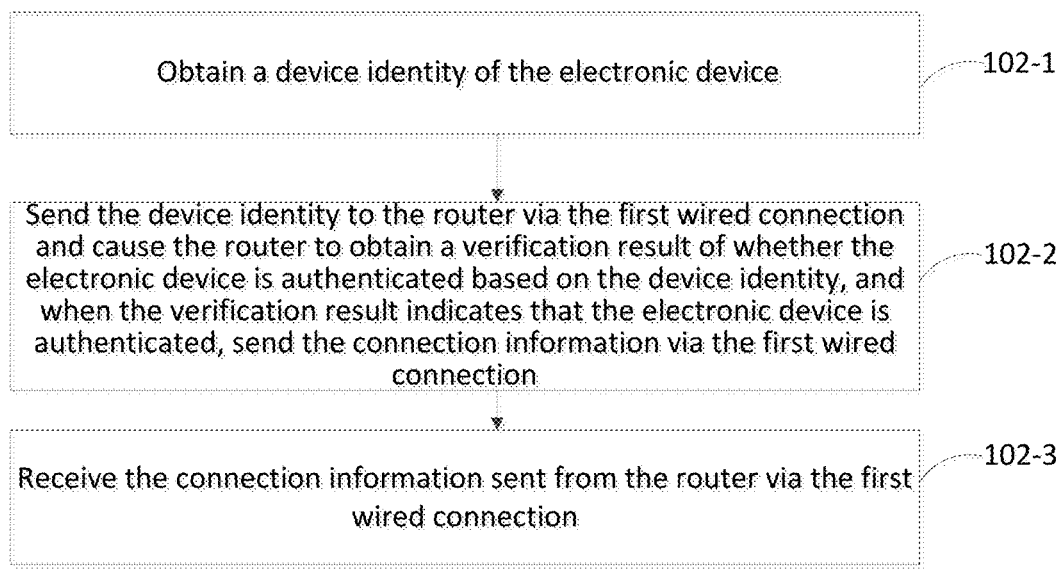
FIG. 2 is a flowchart showing another method for establishing a wireless connection according to an exemplary embodiment of the present disclosure.

To avoid leaking the connection information to an unauthenticated device via the wired connection, so as to further guarantee the information security, step 102 may be implemented as shown steps 102-1, 102-2, and 102-3 in FIG. 2. In step 102-1, a device identity of the smart device is obtained. For example, the smart device may display a preset virtual button. A virtual button may be button on a touch screen. If a user selects the virtual button by pressing it, the smart device determines that the smart device currently needs to obtain the connection information for enabling a wireless connection to the router. At this time, the smart device may automatically obtain the device identity of itself. The device identity may be a Serial Number (SN), a Media Access Control (MAC) address or International Mobile Equipment Identity (IMEI). In step 102-2, the device identity is sent to the router via the established first connection and the router obtains a verification result of whether the smart device is authenticated according to the device identity. For example, the router may forward the device identity information to a verification server which verifies whether the smart device is authenticated based on the identity information of the smart device. When the verification result from the server is received by the router and when it indicates that the smart device is authenticated, the router may then send the connection information via the first connection to the smart device. The verification server may be remote to the router but connected to the router via known communication networks. In step 102-3, the connection information is sent from the router via the first connection to the smart device and is received by the smart device.

The connection information for establishing the wireless connection to the router discussed above may include but is not limited to a target Service Set Identifier (SSID) of the router and a preset password.

Figure 3:
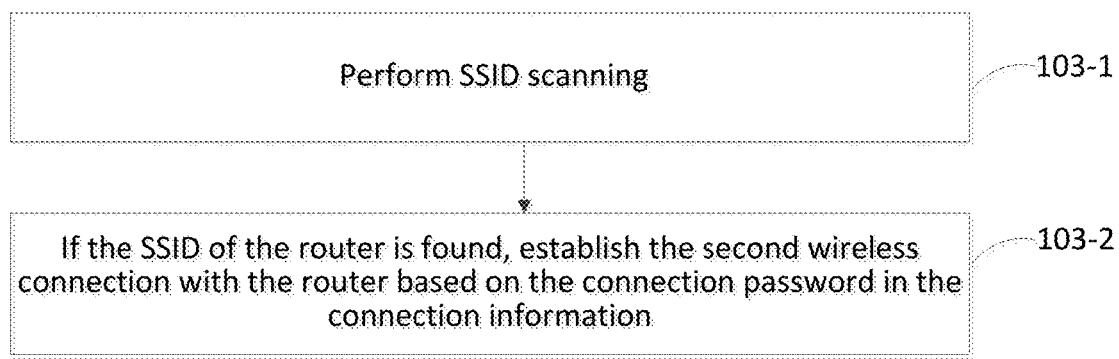
FIG. 3 is a flowchart showing another method for establishing a wireless connection according to an exemplary embodiment of the present disclosure.

Back to FIG. 1 and in step 103, based on the connection information obtained from the router via the first connection, a second wireless connection is established between the smart device and the router. As an example, step 103 may be implemented as steps 103-1 and 103-2, as shown in FIG. 3. In step 103-1, SSID scanning is performed by the smart device. Specifically, the smart device may scan SSIDs of available wireless networks signal within a range around where the smart device currently is. In step 103-2, if the target SSID (the SSID contained in the connection information) is found, the second connection is established with the router as a Wireless Fidelity (Wi-Fi) connection after verification of the password from the smart device.

Thus, in the embodiment of FIG. 1, before the smart device proceeds to establish the second connection with the router in a wireless connection manner, the smart device first establishes a first wired connection with the router to obtains connection information for the second wireless connection via the first wired connection. The connection information provides the credential for the smart device to connect wirelessly to the router. Because the smart device obtains the connection information in the wired connection manner, leakage of the connection information of the router can be reduced and thereby information security is improved.

Figure 4:
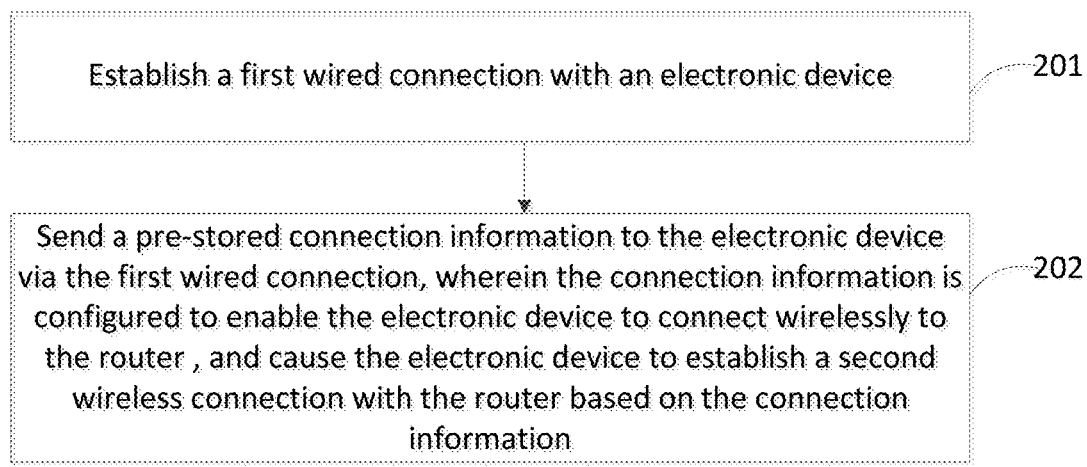
FIG. 4 is a flowchart showing another method for establishing a wireless connection according to an exemplary embodiment of the present disclosure.

FIG. 4 shows another method for establishing a wireless connection with a router according to an exemplary embodiment. The router may provide a USB interface. In step 201, a first connection is established with a smart device in a wired connection manner. A user of a smart device may connect the smart device and the USB interface of the router in a wired connection manner by a data line. When the router detects that a first connection is established between the USB interface of the router and a USB interface of the smart device connected by a data line, the router proceeds to send a pre-stored connection information to the smart device via the first connection in step 202, wherein the connection information is configured to enable the smart device to connect wirelessly to the router. In one implementation, the router may be configured to automatically send the connection information to the smart device via the first connection once the router detects that the first connection is established. Using the received connection information, the smart device may establish a second connection wirelessly with the router by similar approaches described for FIG. 1.

Figure 5:
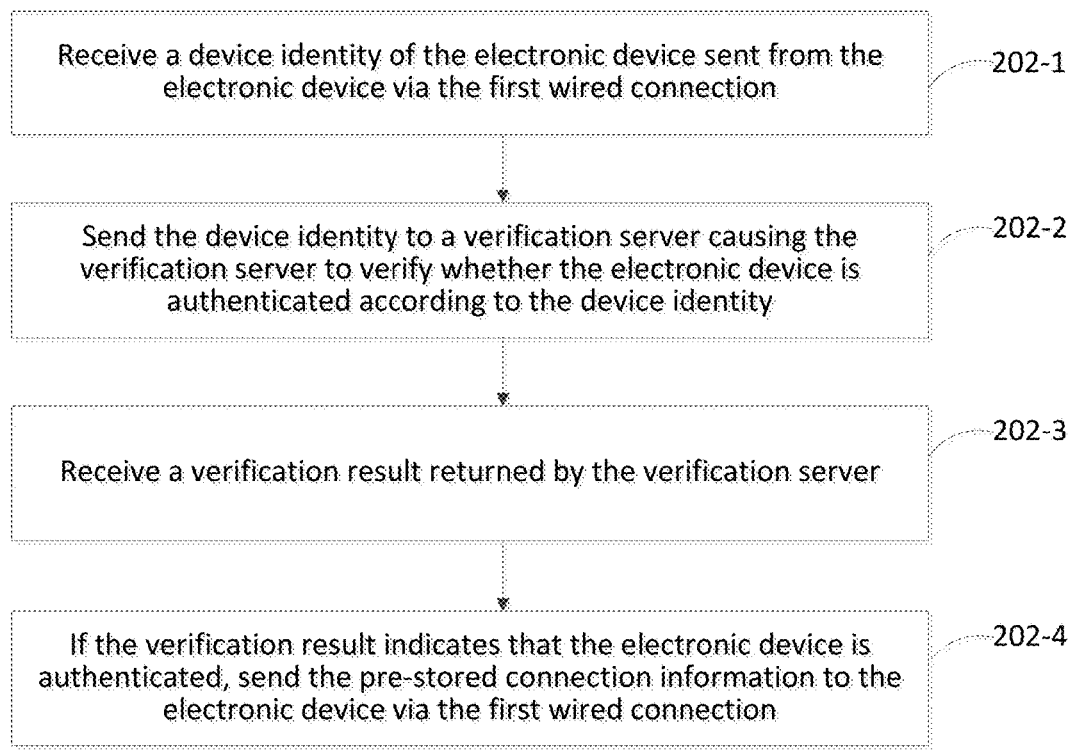
FIG. 5 is a flowchart showing another method for establishing a wireless connection according to an exemplary embodiment of the present disclosure.

In order to avoid leakage of the connection information to an unauthenticated device via the wired connection so as to further guarantee the information security, step 202 may be implemented as step 202-1, 202-2, and 202-3, shown in FIG. 5. In step 202-1, a device identity of the smart device is sent from the smart device via the first connection and is received by the router. For example, the device identity may be the SN, MAC address or IMEI of the smart device. In step 202-2, the device identity is forwarded by the router to a verification server, so that the verification server verifies whether the smart device is authenticated based on the device identity. In step 202-3, a verification result is returned by the verification server and is received by the router. The verification server may be remote to the router but connected to the router via known communication networks. In step 202-4, if the verification result indicates that the smart device is authenticated, the pre-stored connection information is sent by the router to the smart device via the first connection.

Figure 6:
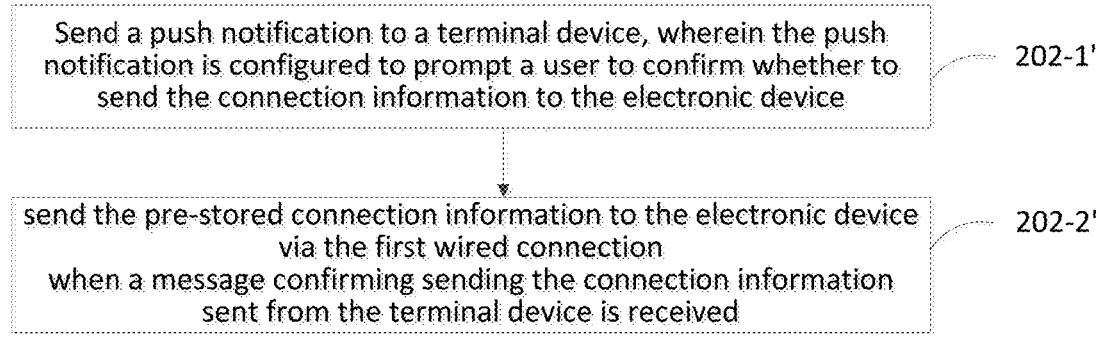
FIG. 6 is a flowchart showing another method for establishing a wireless connection according to an exemplary embodiment of the present disclosure.

Alternatively for step 202, before sending the connection information to the smart device, the router may send a notification (such as a push notification) to a terminal in which a router management application program APP is pre-installed. The terminal and the smart device may be two separate devices. For example, the smart device may be a laptop computer whereas the terminal may be a mobile phone capable of receiving push notifications. The user of the terminal may have to option to decide whether to permit the router to send the connection information to the smart device. Step 202 thus may be implemented as step 202-1' and 202-2' shown in FIG. 6. In step 202-1', a push notification is sent by the router to a terminal, wherein the push notification is configured to prompt the user to confirm whether the router should send the connection information to the smart device. After receiving the push notification, the APP installed in the terminal outputs the push notification for the user of the terminal to decide whether to agree to sending the connection information to the smart device by the router. In step 202-2', if the user of the terminal agrees to sending the connection information to the smart device by the router by, for example, clicking a yes button on the APP interface on the terminal, the terminal returns a confirmation message to the router to permit sending of the connection information to the smart device by the router. After receiving the confirmation message, the router automatically sends the pre-stored connection information to the smart device via the first connection.

Thus, in the embodiment of FIG. 2, the router sends the connection information to the smart device via a wired connection after authentication. The connection information is configured to enable the smart device connected wirelessly to the router. Leakage of the connection information of the router is reduced and information security is improved.

Figure 7A:
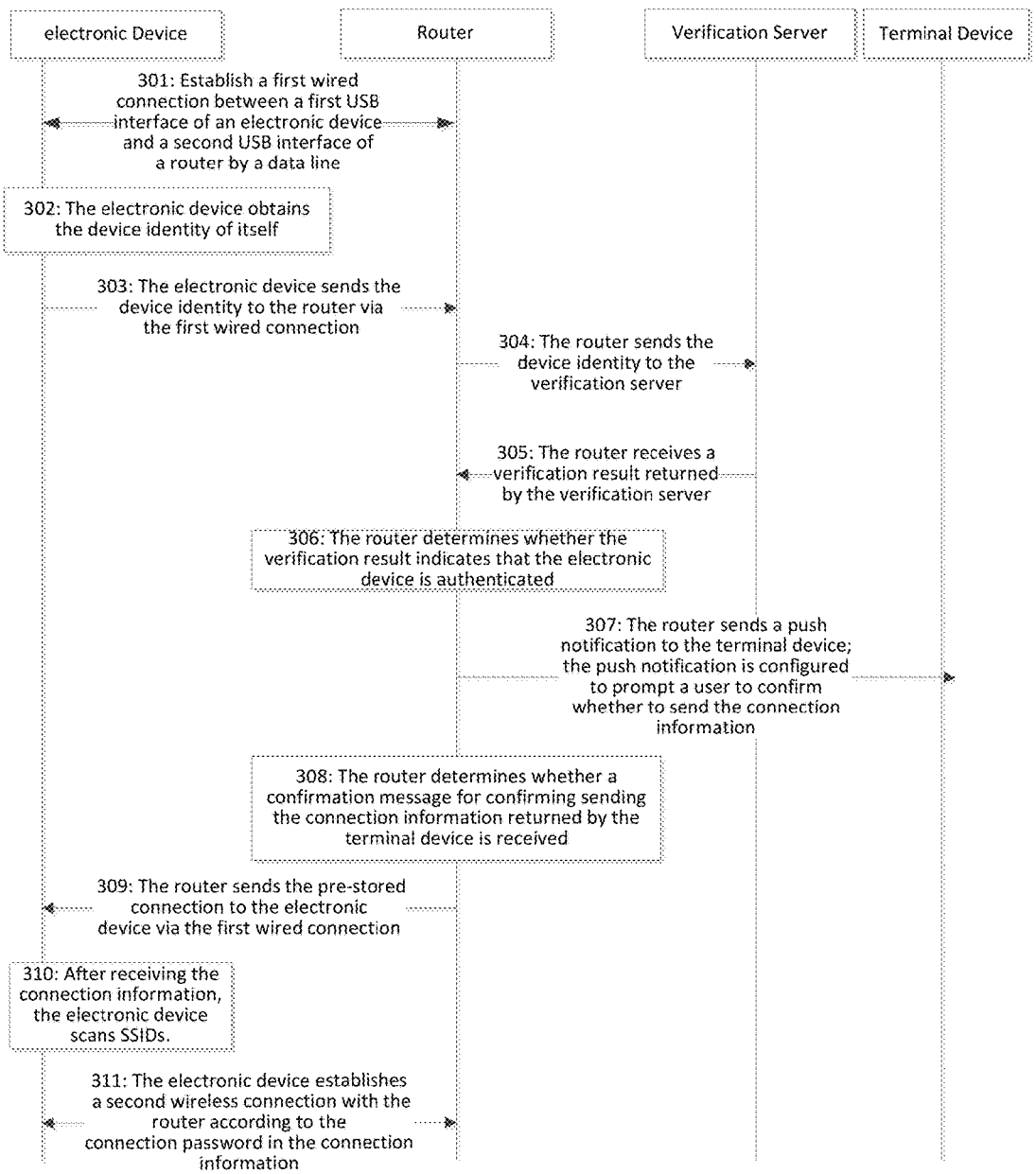

FIG. 7A shows another method for establishing a connection according to an exemplary embodiment. In step 301, a first connection is established between a first USB interface of a smart device and a second USB interface of a router by a data line. In step 302, the smart device obtains its device identity such as SN, MAC address or IMEI of the smart device. In step 303, the smart device sends the device identity to the router via the first connection. In step 304, the router forwards the device identity to the verification server to confirm whether the smart device is authenticated. In step 305, the router receives a verification result returned by the verification server. In step 306, the router determines whether the verification result indicates that the smart device is authenticated. If the smart device is authenticated, step 307 is performed. If the smart device is unauthenticated, the current procedure for establishing a connection ends. In step 307, the router sends a push notification to a terminal pre-installed with a router management APP. The push notification is configured to inquire whether the user of the terminal agrees to sending the connection information by the router to the smart device. In step 308, the router determines whether a confirmation message for agreeing to send the connection information is returned by the terminal. If the confirmation message is received, step 309 is performed; if the confirmation message is not received, the current procedure for establishing a connection ends. In step 309, the router sends the pre-stored connection information to the smart device via the first connection. In step 310, after receiving the connection information, the smart device scans available SSIDs of wireless networks (e.g., Wi-Fi networks) near the smart device. If the smart device finds the target SSID (SSID of the router), step 311 is performed. In step 311, the smart device establishes a second connection with the router wirelessly based on the password in the connection information. The entire flowchart of the above method is also shown in FIG. 7B.

The order of the steps in the method of FIG. 7 is not in any way limited by the description above. For example, the router may firstly determine whether the confirmation message sent from the terminal device is received, and then determine whether the verification result returned by the verification server indicates that the smart device is authenticated.

Thus, in the embodiments above, a smart device firstly establishes a first connection with a router in a wired connection manner, and then obtains connection information via the first connection. Further, the smart device, based on the connection information, establishes a second connection with the router in a wireless connection manner. Because the smart device obtains the connection information of the router in the wired connection manner, leakage of the connection information of the router can be reduced and thereby information security is improved.

Corresponding to the above embodiments of methods for establishing a wireless connection, the present disclosure further provides embodiments of devices for establishing a wireless connection.

Figure 8:
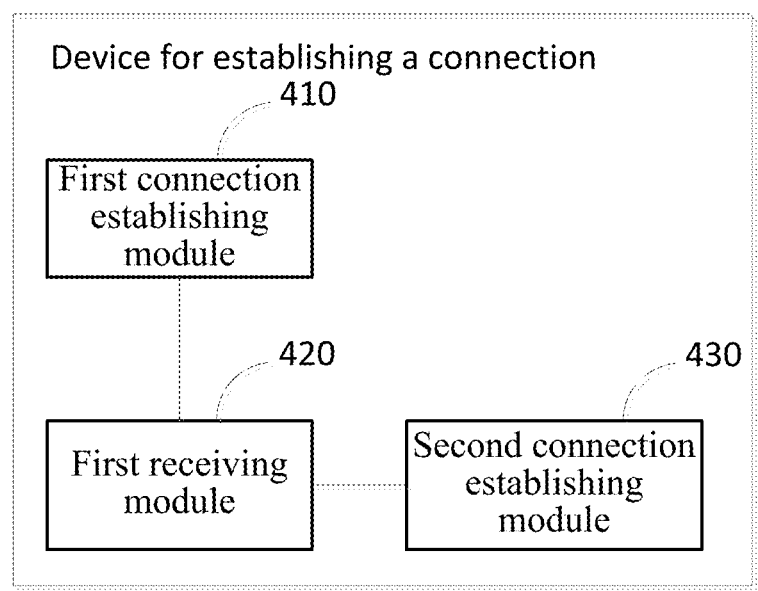
FIG. 8 is a block diagram showing a device for establishing a wireless connection according to an exemplary embodiment of the present disclosure.

FIG. 8 is a block diagram showing a device for establishing a wireless connection according to an exemplary embodiment of the present disclosure. The device may be included in a smart device and comprises a first connection establishing module 410, a first receiving module 420 and a second connection establishing module 430.

The first connection establishing module 410 is configured to establish a first connection with a router in a wired connection manner. The first receiving module 420 is configured to receive connection information sent from the router via the first connection established by the first connection establishing module, wherein the connection information is configured to enable the smart device to connect to the router in a wireless connection manner. The second connection establishing module 430 is configured to, according to the connection information received by the first receiving module 420, establish a second connection with the router in the wireless connection manner.

Thus, in the embodiment if FIG. 8, a smart device firstly establishes a first connection with a router in a wired connection manner, and then obtains a connection information via the first connection, wherein the connection information is configured to enable the smart device to be connected to the router in a wireless connection manner. Further, the smart device, according to the connection information, establishes a second connection with the router in the wireless connection manner. Because the smart device obtains the connection information of the router in the wired connection manner, leakage of the connection information can be reduced and thereby information security is improved.

Figure 9:
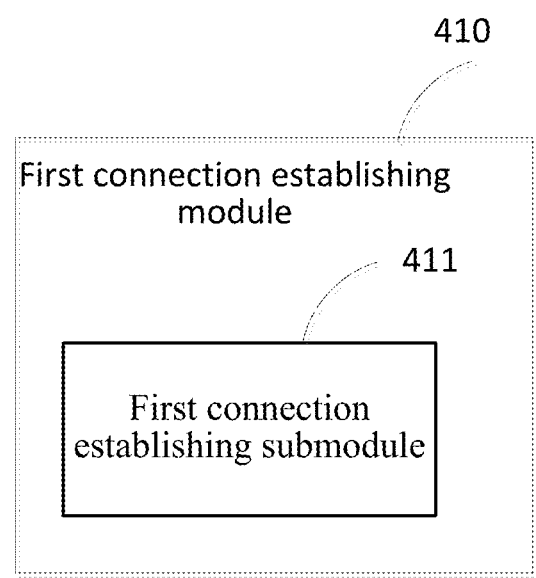
FIG. 9 is a block diagram showing another device for establishing a wireless connection according to an exemplary embodiment of the present disclosure.

FIG. 9 is a block diagram showing an implementation of the module 410 in FIG. 8. In this implementation, the first connection establishing module 410 comprises a first connection establishing submodule 411 configured to establish the first wired connection between a first Universal Serial Bus (USB) interface of the smart device and a second USB interface of the router by a data line such as a USB cable.

Figure 10:
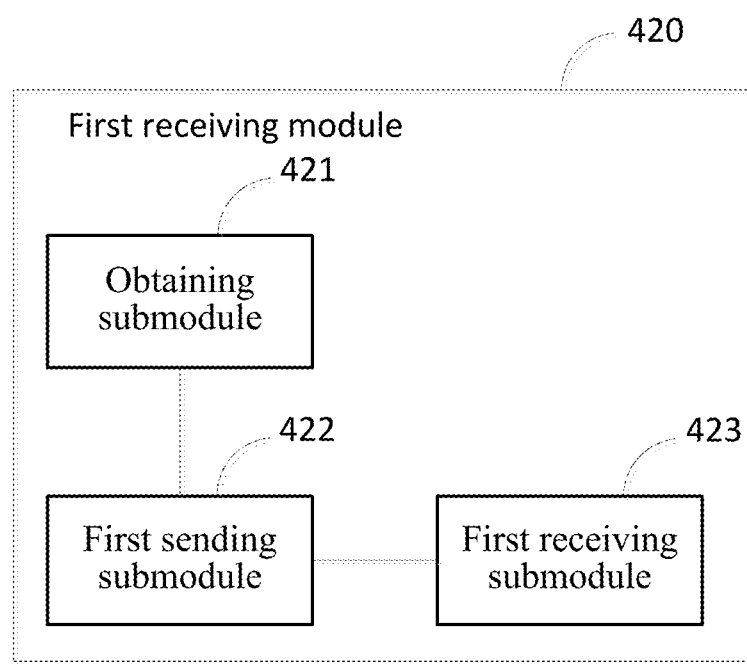
FIG. 10 is a block diagram showing another device for establishing a wireless connection according to an exemplary embodiment of the present disclosure.

FIG. 10 is a block diagram showing an implementation of the module 420 of FIG. 8. In this implementation, the first receiving module 420 comprises an obtaining submodule 421, a first sending submodule 422 and a first receiving submodule 423. The obtaining submodule 421 is configured to obtain a device identity of the smart device. The first sending submodule 422 is configured to send the device identity obtained by the obtaining submodule 421 to the router via the first connection and cause the router to obtain a verification result of whether the smart device is authenticated based on the device identity, and to send the connection information via the first connection to the smart device when the verification result indicates that the smart device is authenticated. The first receiving submodule 423 is configured to receive the connection information sent from the router via the first connection established by the first connection establishing module 410. Thus, in this implementation, the smart device may send the device identity of itself to the router via the first connection after establishing the first connection with the router in the wired connection manner, and the router may obtain a verification result of whether the smart device is authenticated. The router sends pre-stored connection information to the smart device when the verification result indicates that the smart device is authenticated. The information security is thus further improved.

As an example, the connection information received by the first receiving module 420 may comprises a Service Set Identifier (SSID) of the router and a connection password.

Figure 11:
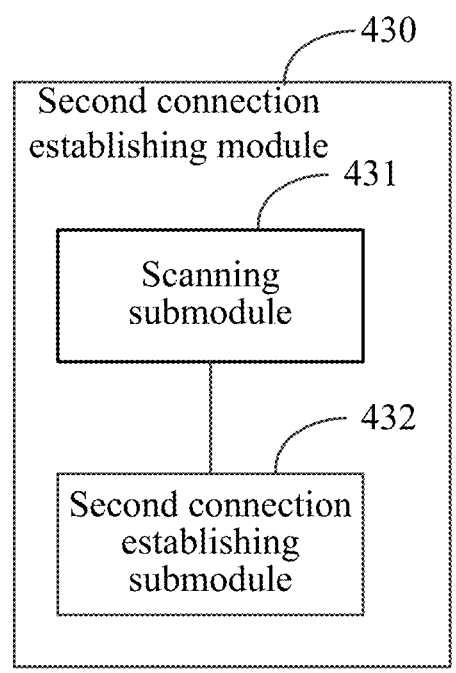
FIG. 11 is a block diagram showing another device for establishing a wireless connection according to an exemplary embodiment of the present disclosure.

FIG. 11 is a block diagram showing an implementation of the module 430 of FIG. 8. In this implementation, the second connection establishing module 430 in this embodiment comprises a scanning submodule 431 and a second connection establishing submodule 432. The scanning submodule 431 is configured to perform SSID scanning of available wireless networks within the range of the smart device. The second connection establishing submodule 432 is configured to establish the second connection with the router in a wireless connection manner, e.g., Wireless Fidelity (Wi-Fi), based on the connection password received by the first receiving module 420, when the SSID of the router received by the first receiving module 420 is found in the scan. Thus, in this implementation, after receiving the connection information, the smart device may scan available SSIDs. If the SSID of the router in the connection information is found, the smart device may establish a second wireless connection with the router using the password.

Figure 12:
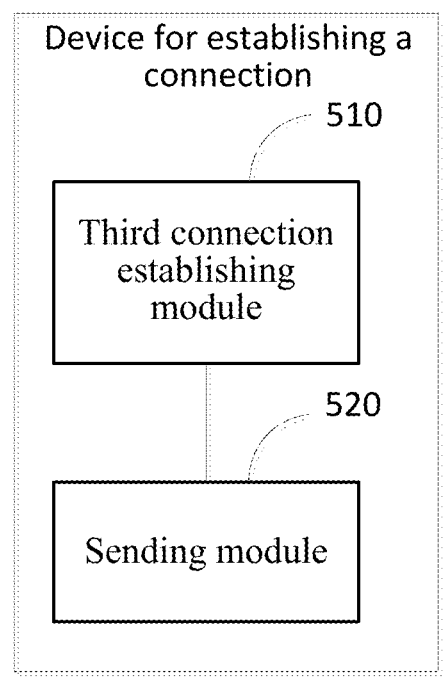
FIG. 12 is a block diagram showing another device for establishing a wireless connection according to an exemplary embodiment of the present disclosure.

FIG. 12 is a block diagram showing another device for establishing a wireless connection according to an exemplary embodiment of the present disclosure. The device may be included in a router and comprises a third connection establishing module 510 and a sending module 520. The third connection establishing module 510 is configured to establish a first connection with a smart device in a wired connection manner. The sending module 520 is configured to send pre-stored connection information to the smart device via the first connection established by the third connection establishing module 510, wherein the connection information is configured to enable the smart device to connect to the router in a wireless connection manner and to causes the smart device to establish a second connection with the router in the wireless connection manner based on the connection information.

Figure 13:
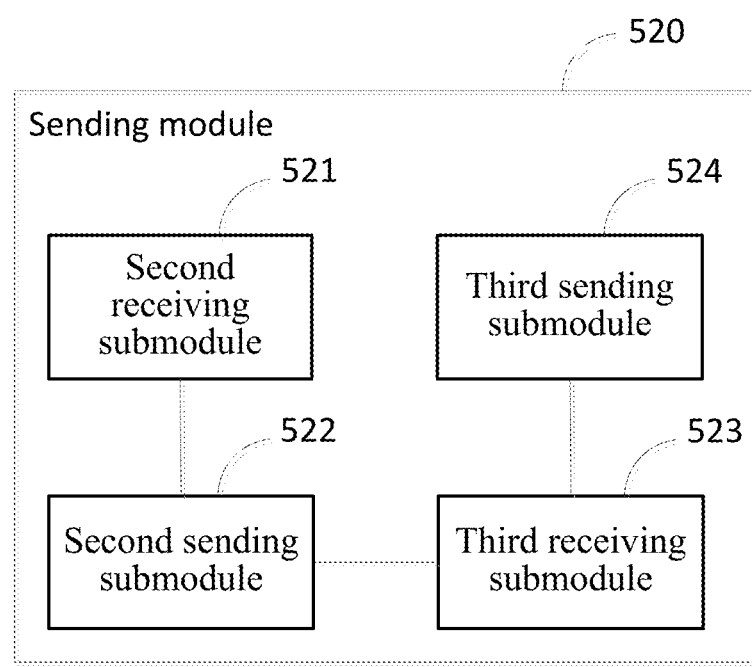
FIG. 13 is a block diagram showing another device for establishing a wireless connection according to an exemplary embodiment of the present disclosure.

FIG. 13 is a block diagram showing one implementation of the module 520 of FIG. 12. In this implementation the sending module 520 comprises a second receiving submodule 521, a second sending submodule 522, a third receiving submodule 523 and a third sending submodule 524. The second receiving submodule 521 is configured to receive a device identity of the smart device sent from the smart device via the first connection established by the third connection establishing module 510. The second sending submodule 522 is configured to send the device identity received by the second receiving submodule 521 to a verification server and to cause the verification server to verify whether the smart device is authenticated based on the device identity. The third receiving submodule 523 is configured to receive a verification result returned by the verification server. The third sending submodule 524 is configured to send the pre-stored connection information to the smart device via the first connection established by the third connection establishing module 510.

Figure 14:
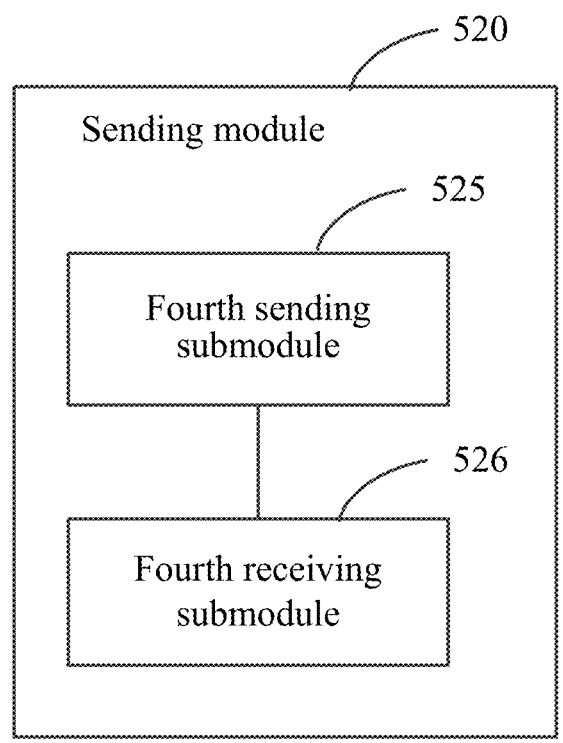
FIG. 14 is a block diagram showing another device for establishing a wireless connection according to an exemplary embodiment of the present disclosure.

FIG. 14 is a block diagram showing another implementation of the module 520 of FIG. 12. In this implementation, the sending module 520 comprises a fourth sending submodule 525 and a fourth receiving submodule 526. The fourth sending submodule 525 is configured to send a push notification to a terminal device, wherein the push notification is configured to prompt a user to confirm whether to send the connection information to the smart device. The fourth receiving submodule 526 is configured to send the pre-stored connection information to the smart device via the first connection if a confirmation message for confirming sending the connection information sent from the terminal device is received.

In the above embodiment, before sending the connection information to the smart device, the router may firstly send a push notification to a terminal device in which a router management application program APP is pre-installed to prompt a user of the terminal to decide whether to send the connection information.

Correspondingly, the present disclosure provides a device for establishing a wireless connection comprising: a processor; a memory for storing instructions executable by the processor; a wireless connection interface; and a wired connection interface, wherein the processor is configured to: establish a first connection with a router via the wired connection interface; receive a connection information sent from the router via the first connection, wherein the connection information is configured to enable the device to connect to the router via the wireless connection interface; and establish a second connection with the router via the wireless connection interface.

Correspondingly, the present disclosure provides a device for establishing a connection. The device may be included in a router and comprises: a processor; a memory for storing instructions executable by the processor; a wireless connection interface; and a wired connection interface, wherein the processor is configured to: establish a first connection with a smart device via the wired connection interface; send pre-stored connection information to the smart device via the first connection, wherein the connection information is configured to enable the smart device to connect wirelessly to the router; and causing the smart device to establish a second connection with the router via the wireless connection interface based on the connection information.

Figure 15:
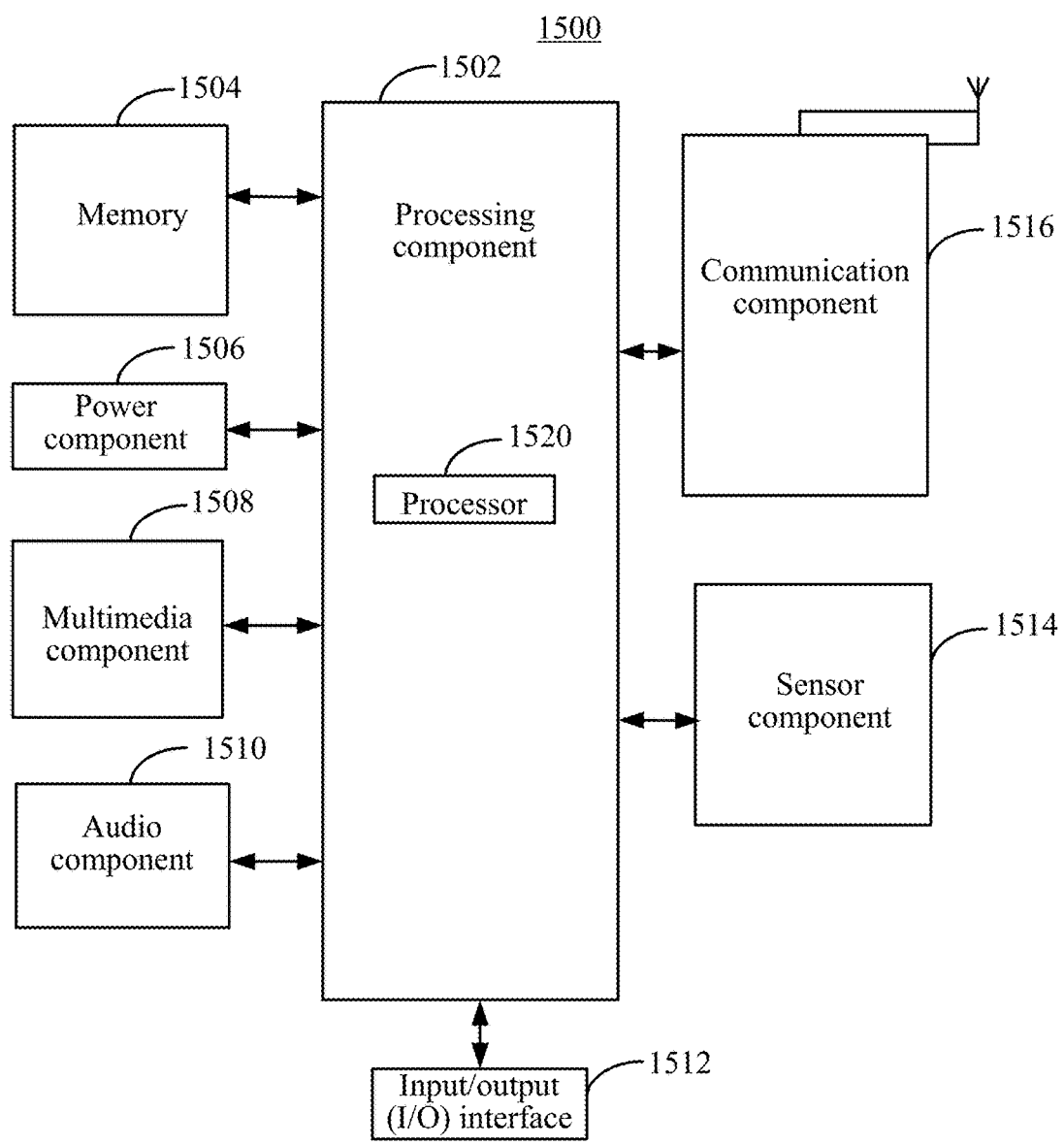
FIG. 15 is a block diagram showing yet another device for establishing a wireless connection according to an exemplary embodiment of the present disclosure.

FIG. 15 is a block diagram showing a structure of a device 1500 for establishing a connection according to an exemplary embodiment of the present disclosure. For example, the device 1500 may be a smart device having a USB interface, such as a mobile phone, a computer, a digital broadcast terminal, a messaging device, a smart socket, a smart sphygmomanometer, a gaming console, a tablet, a medical device, exercise equipment, a personal digital assistant, a smart wristband, a smart watch, and the like.

Referring to FIG. 15, the device 1500 may include one or more of the following components: a processing component 1502, a memory 1504, a power component 1506, a multimedia component 1508, an audio component 1510, an input/output (I/O) interface 1512, a sensor component 1514, and a communication component 1516.

The processing component 1502 controls overall operations of the device 1500, such as the operations associated with display, telephone calls, data communications, camera operations, and recording operations. The processing component 1502 may include one or more processors 1520 to execute instructions to perform all or part of the steps in the above described methods. Moreover, the processing component 1502 may include one or more modules which facilitate the interaction between the processing component 1502 and other components. For instance, the processing component 1502 may include a multimedia module to facilitate the interaction between the multimedia component 1508 and the processing component 1502.

The memory 1504 is configured to store various types of data to support the operation of the device 1500. Examples of such data include instructions for any applications or methods operated on the device 1500, contact data, phonebook data, messages, pictures, video, etc. The memory 1504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1506 provides power to various components of the device 1500. The power component 1506 may include a power management system, one or more power sources, and any other components associated with the generation, management, and distribution of power in the device 1500.

The multimedia component 1508 includes a display screen providing an output interface between the device 1500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1508 includes a front camera and/or a rear camera. The front camera and the rear camera may receive an external multimedia data while the device 1500 is in an operation mode, such as a photographing mode or a video mode. Each of the front camera and the rear camera may be a fixed optical lens system or have focus and optical zoom capability.

The audio component 1510 is configured to output and/or input audio signals. For example, the audio component 1510 may include a microphone ("MIC") configured to receive an external audio signal when the device 1500 is in an operation mode, such as a call mode, a recording mode, and a voice recognition mode. The received audio signal may be further stored in the memory 1504 or transmitted via the communication component 1516. In some embodiments, the audio component 1510 further includes a speaker to output audio signals.

The I/O interface 1512 provides an interface between the processing component 1502 and peripheral interface modules, such as a keyboard, a click wheel, buttons, and the like. The buttons may include, but are not limited to, a home button, a volume button, a starting button, and a locking button.

The sensor component 1514 includes one or more sensors to provide status assessments of various aspects of the device 1500. For instance, the sensor component 1514 may detect an open/closed status of the device 1500, relative positioning of components, e.g., the display and the keypad, of the device 1500, a change in position of the device 1500 or a component of the device 1500, a presence or absence of user contact with the device 1500, an orientation or an acceleration/deceleration of the device 1500, and a change in temperature of the device 1500. The sensor component 1514 may include a proximity sensor configured to detect the presence of nearby objects without any physical contact. The sensor component 1514 may also include a light sensor, such as a CMOS or CCD image sensor, for use in imaging applications. In some embodiments, the sensor component 1514 may also include an accelerometer sensor, a gyroscope sensor, a magnetic sensor, a pressure sensor, a microwave sensor, or a temperature sensor or thermometer.

The communication component 1516 is configured to facilitate communication, wired or wirelessly, between the device 1500 and other devices. The device 1500 can access a wireless network based on a communication standard, such as Wi-Fi, 2G, 3G, LTE or 4G cellular technologies, or a combination thereof. The communication component 1516 may comprise wired communication interface such as USB interface. In one exemplary embodiment, the communication component 1516 receives a broadcast signal or broadcast associated information from an external broadcast management system via a broadcast channel. In one exemplary embodiment, the communication component 1516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1504, executable by the processor 1520 in the device 1500, for performing the above-described methods. For example, the non-transitory computer-readable storage medium may be a ROM, a RAM, a CD-ROM, a magnetic tape, a floppy disc, an optical data storage device, and the like.

Figure 16:
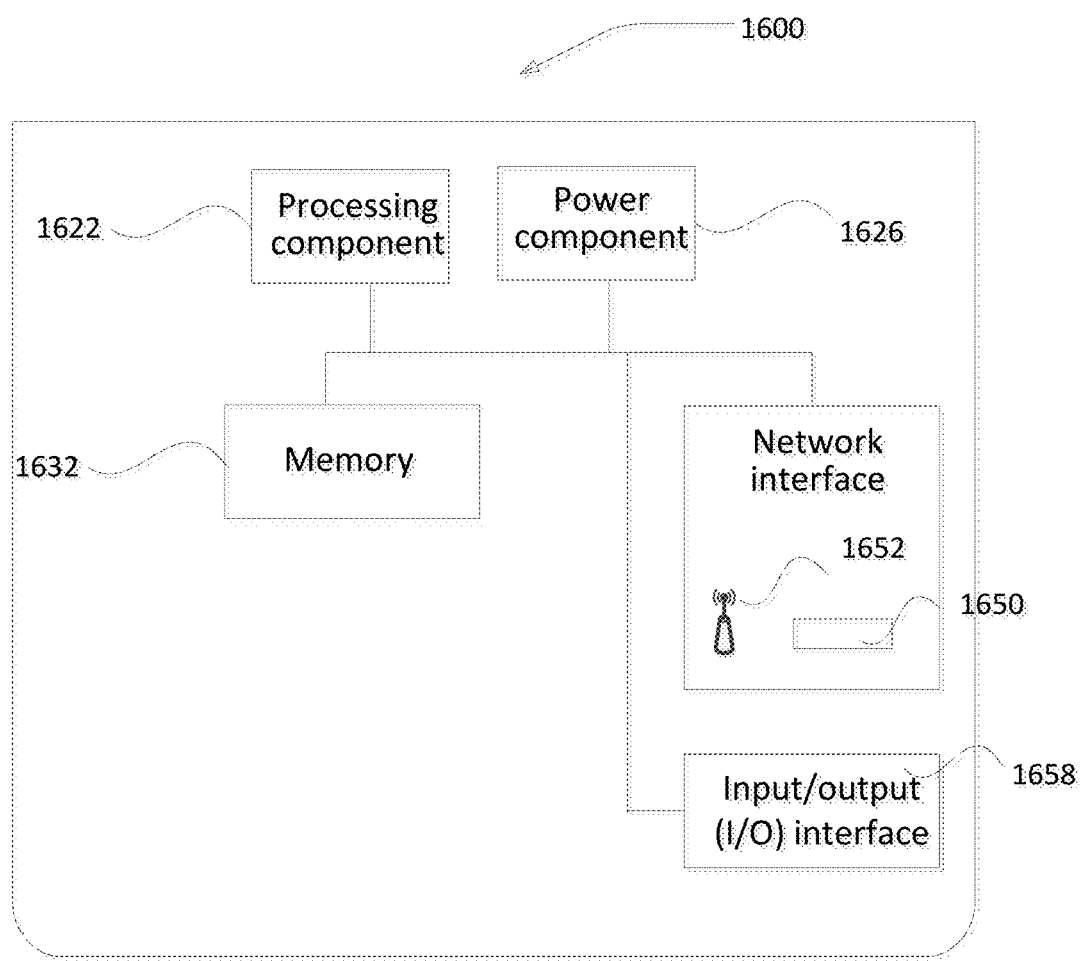
FIG. 16 is a block diagram showing a further device for establishing a wireless connection according to an exemplary embodiment of the present disclosure.

FIG. 16 is a block diagram showing another device 1600 for establishing a wireless connection according to an exemplary embodiment of the present disclosure. For example, the device 1600 may be a router with a USB interface. Referring to FIG. 16, the device 1600 includes a processing component 1622 that further includes one or more processors, and memory resources represented by a memory 1632 for storing instructions executable by the processing component 1622, such as application programs. The application programs stored in the memory 1632 may include one or more modules each corresponding to a set of instructions. Further, the processing component 1622 is configured to execute the instructions to perform the above described methods for establishing a connection.

The device 1600 may also include a power component 1626 configured to perform power management of the device 1600, wired interface 1650 and wireless network interface(s) 1652 configured to connect the device 1600 to a network or another device, and an input/output (I/O) interface 1658. The device 1600 may operate based on an operating system stored in the memory 1632, such as Windows Server™, Mac OS X™, Unix™, Linux™, FreeBSD™, or the like.

Figure 17:
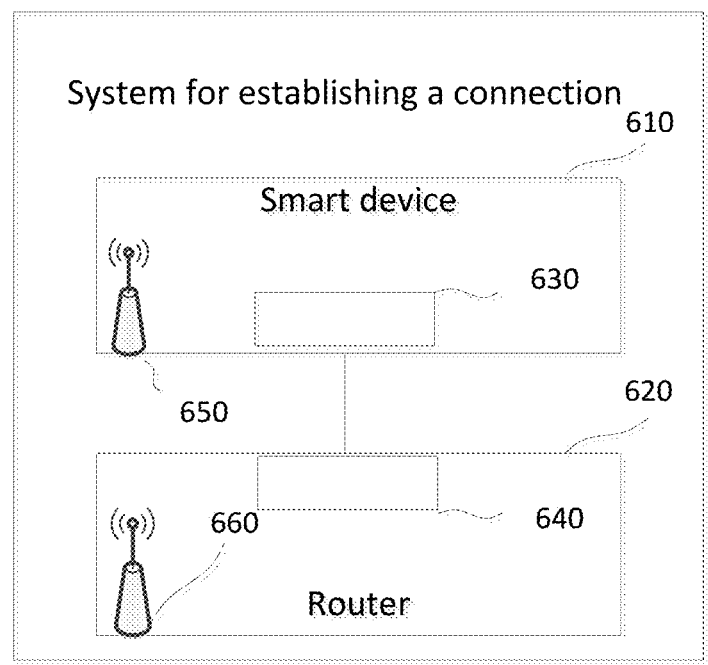
FIG. 17 is a block diagram showing a system for establishing a wireless connection according to an exemplary embodiment of the present disclosure.

FIG. 17 is a block diagram showing a system for establishing a wireless connection according to an exemplary embodiment of the present disclosure. The system may include a smart device 610 (i.e., the device for establishing a connection as shown in FIGS. 8-11) and a router 620 (i.e., the device for establishing a connection as shown in FIGS. 12-14). The smart device 610 may comprise a wired connection interface 630 (such as USB interface) and a wireless connection interface 650. The Router also comprises a wired connection interface 640 and a wireless connection interface 660.

Figure 18:
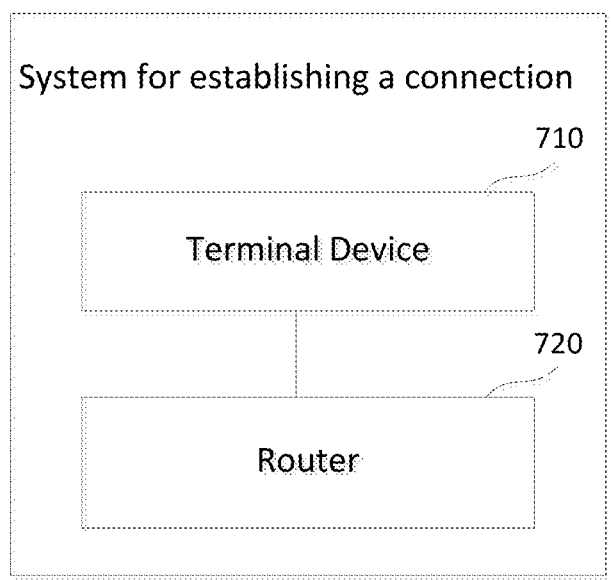
FIG. 18 is a block diagram showing another system for establishing a wireless connection according to an exemplary embodiment of the present disclosure.

FIG. 18 is a block diagram showing another system for establishing a wireless connection according to an exemplary embodiment of the present disclosure. The system includes a terminal 710 (for example, as shown in FIG. 15) and a router 720 (for example, as shown in FIG. 16).

Each module or unit discussed above for FIG. 4-9, such as the first connection establishing module, the first receiving module, the second connection establishing module, the first connection establishing submodule, the obtaining submodule, the first sending submodule, the first receiving submodule, the scanning submodule, the second connection establishment submodule, the third connection establishing module, the second receiving submodule, the second sending submodule, the third sending submodule, the third receiving submodule, the fourth sending submodule, and the fourth receiving submodule the sending module, may take the form of a packaged functional hardware unit designed for use with other components, a portion of a program code (e.g., software or firmware) executable by the processor 1520 or the processing circuitry that usually performs a particular function of related functions, or a self-contained hardware or software component that interfaces with a larger system, for example.

The illustrations of the embodiments described herein are intended to provide a general understanding of the structure of the various embodiments. The illustrations are not intended to serve as a complete description of all of the elements and features of apparatus and systems that utilize the structures or methods described herein. Other embodiments of the disclosure will be apparent to those skilled in the art from consideration of the specification and practice of the embodiments disclosed herein. This application is intended to cover any variations, uses, or adaptations of the disclosure following the general principles thereof and including such departures from the present disclosure as come within known or customary practice in the art. It is intended that the specification and examples are considered as exemplary only, with a true scope and spirit of the invention being indicated by the following claims in addition to the disclosure.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for establishing a wireless connection for an electronic device performed by the electronic device containing a microprocessor, comprising:
    establishing a first wired connection with a router;
    automatically displaying a virtual button on the electronic device in response to establishing the first wired connection;
    obtaining a device identity of the electronic device in response to an activation of the virtual button;
    sending the device identity to the router via the first wired connection;
    causing the router to obtain a verification result of whether the electronic device is authenticated based on the device identity;
    receiving, via the first wired connection, connection information from the router when the verification result indicates that the electronic device is authenticated, wherein the connection information is configured to enable the electronic device to connect wirelessly to the router; and
    after verification of the connection information received from the router via the first wired connection, establishing a second wireless connection with the router.

2. The method according to claim 1, wherein establishing the first wired connection with the router comprises:
    establishing the first wired connection between a first Universal Serial Bus (USB) interface of the electronic device and a second USB interface of the router by a data line.

3. The method according to claim 1, wherein the connection information comprises a Service Set Identifier (SSID) of the router and a connection password.

4. The method according to claim 3, wherein establishing the second wireless connection with the router comprises:
    performing SSID scanning for available wireless networks; and
    establishing the second wireless connection with the router by providing the router the connection password when the SSID of the router is found.

5. A method for establishing a wireless connection performed by a router including a microprocessor, comprising:
    establishing a first wired connection with an electronic device, causing the electronic device to automatically display a virtual button and to obtain a device identity of the electronic device in response to an activation of the virtual button;
    receiving the device identity from the electronic device via the first wired connection;
    sending the device identity to a verification server and causing the verification server to verify whether the electronic device is authenticated based on the device identity;
    receiving a verification result returned by the verification server;
    sending, via the first wired connection, pre-stored connection information to the electronic device when the verification result indicates that the electronic device is authenticated, wherein the pre-stored connection information is configured to enable the electronic device to connect wirelessly to the router; and
    after verification of the pre-stored connection information received by the electronic device via the first wired connection, causing the electronic device to establish a second wireless connection with the router.

6. The method according to claim 5, wherein sending the pre-stored connection information to the electronic device via the first wired connection, comprises:
    sending a push notification to a terminal device independent of the electronic device, wherein the push notification is configured to prompt a user to confirm whether to send the pre-stored connection information to the electronic device; and
    sending the pre-stored connection information to the electronic device via the first wired connection when a message sent from the terminal device confirming sending the pre-stored connection information is received.

7. An electronic device comprising:
    a microprocessor;
    a memory for storing instructions executable by the microprocessor;
    wireless connection interface circuitry; and
    wired connection interface circuitry,
    wherein the microprocessor, when executing the instructions, is configured to:

establish a first wired connection with a router via the wired connection interface circuitry of the electronic device;

automatically display a virtual button on the electronic device in response to establishing the first wired connection;

obtain a device identity of the electronic device in response to an activation of the virtual button;

send the device identity to the router via the first wired connection, causing the router to obtain a verification result of whether the electronic device is authenticated based on the device identity;

receive, via the first wired connection, connection information from the router when the verification result indicates that the electronic device is authenticated, wherein the connection information is configured to enable the electronic device to connect wirelessly to the router; and after verification of the connection information received from the router via the first wired connection, establish a second wireless connection with the router via the wireless connection interface circuitry.

8. The electronic device according to claim 7, wherein the wired connection interface circuitry comprises a Universal Serial Bus (USB) interface circuitry.

9. The electronic device according to claim 7, wherein the connection information comprises a Service Set Identifier (SSID) of the router and a connection password.

10. The electronic device according to claim 9, wherein the microprocessor is configured to:

perform SSID scanning for available wireless networks; and establish the second wireless connection with the router by providing the router the connection password when the SSID of the router is found.

11. A router, comprising:

a microprocessor;

a memory for storing instructions executable by the microprocessor;

a wireless connection interface circuitry; and a wired connection interface circuitry, wherein the microprocessor, when executing the instructions, is configured to:

establish a first wired connection with an electronic device via the wired connection interface circuitry, causing the electronic device to automatically display a virtual button and to obtain a device identity of the electronic device in response to an activation of the virtual button;

receive the device identity sent from the electronic device via the first wired connection circuitry;

send the device identity to a verification server and causing the verification server to verify whether the electronic device is authenticated based on the device identity;

receive a verification result returned by the verification server;

send, via the first wired connection, pre-stored connection information to the electronic device when the verification result indicate that the electronic device is authenticated, wherein the pre-stored connection information is configured to enable the electronic device to connect wirelessly to the router; and after verification of the pre-stored connection information received by the electronic device via the first wired connection, cause the electronic device to establish a second wireless connection with the router via the wireless connection interface circuitry.

12. The router according to claim 11, wherein the microprocessor is further configured to:

send a push notification to a terminal device, wherein the push notification is configured to prompt a user to confirm whether to send the pre-stored connection information; and send the pre-stored connection information to the electronic device via the first wired connection when a message confirming sending the pre-stored connection information sent from the terminal device is received.

13. A system for establishing a connection, comprising:

an electronic device comprising:
  a first microprocessor; and
  a first memory for storing a first set of instructions executable by the first microprocessor;
  first wireless connection interface circuitry; and
  first wired connection interface circuitry; and a router comprising:
  a second microprocessor; and
  a second memory for storing a second set of instructions executable by the second microprocessor;
  second wireless connection interface circuitry; and
  second wired connection interface circuitry, wherein the first microprocessor, when executing the first set of instructions, is configured to:

establish a wired connection with the router via the first wired connection interface circuitry and second wired connection interface circuitry;

automatically display a virtual button on the electronic device in response to establishing the wired connection;

obtain a device identity of the electronic device in response to an activation of the virtual button;

send the device identity to the router via the wired connection, causing the router to obtain a verification result of whether the electronic device is authenticated based on the device identity;

receive, via the first wired connection, a connection information from the router when the verification result indicates that the electronic device is authenticated, wherein the connection information is configured to enable the electronic device to connect wirelessly to the router; and after verification of the connection information received from the router via the first wired connection, establish a wireless connection with the router; and wherein the second microprocessor, when executing the second set of instructions, is configured to:

establish the wired connection with the electronic device via the second and first wired connection interface circuitry, causing the electronic device to automatically display the virtual button and to obtain the device identity in response to the activation of the virtual button;

receive the device identity sent from the electronic device via the wired connection circuitry;

send the device identity to a verification server and causing the verification server to verify whether the electronic device is authenticated based on the device identity;

receive the verification result returned by the verification server;

send, via the first wired connection, the pre-stored connection information to the electronic device when the verification result indicate that the electronic device is authenticated, wherein the connection information is configured to enable the electronic device to connect to the router via the first and second wireless connection interface circuitry; and
after verification of the pre-stored connection information received by the electronic device via the first wired connection, cause the electronic device to establish the wireless connection with the router.

\* \* \* \* \*